US012754022B2

(12) United States Patent
Long, II

(10) Patent No.: US 12,754,022 B2
(45) Date of Patent: Oct. 6, 2026

(54) WEARABLE PERSONAL INSIDE-OUT LOCATION TRACKING

(71) Applicant: Qwake Technologies, Inc., San Francisco, CA (US)

(72) Inventor: John Davis Long, II, New York, NY (US)

(73) Assignee: Qwake Technologies, Inc., San Francisco, CA (US)

(*) Notice: Subject to any disclaimer, the term of this patent is extended or adjusted under 35 U.S.C. 154(b) by 62 days.

(21) Appl. No.: 18/999,363

(22) Filed: Dec. 23, 2024

(65) Prior Publication Data

US 2026/0177386 A1 Jun. 25, 2026

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3617* (2013.01);
(Continued)

(58) Field of Classification Search
CPC .............. G01C 21/362; G01C 21/3632; G01C 21/3638; G01C 21/3644; G01C 21/365;
(Continued)

(56) References Cited

U.S. PATENT DOCUMENTS

| | | | | |
|---|---|---|---|---|
| 7,516,421 B2 * | 4/2009 | Asano | G06Q 20/102 | 715/850 |
| 8,712,686 B2 * | 4/2014 | Bandyopadhyay | G01C 17/38 | 701/445 |

(Continued)

OTHER PUBLICATIONS

Park, S., Park, S.H., Park, L.W., Park, S., Lee, S., Lee, T., Lee, S.H., Jang, H., Kim, S.M., Chang, H., 2018. Design and implementation of a smart IoT based building and town disaster management system in smart city infrastructure. Appl. Sci. 8, 2239. (Year: 2018).*

(Continued)

*Primary Examiner* — Adam R Mott
*Assistant Examiner* — James Miller Watts, III
(74) *Attorney, Agent, or Firm* — Marton Ribera Schumann & Chang LLP; Chien-Ju Alice Chuang

(57) ABSTRACT

A system for a wearable personal inside-out location tracking may include a hands-free wearable display configured to display augmented reality optics among other navigation-related visualizations, a camera and an inertial sensor, and a personal computing system. The personal computing system may be configured to store information and perform computations relating to a method for personal location tracking. Such a method may include initializing a personal navigation history comprising a first-in-first-out (FIFO) queue, inserting into the FIFO queue a waypoint in an order generated by a personal tracking system, generating a cone of visibility by pruning the user's personal navigation history according to a parametric model representing both an egocentric visibility constraint and an environment constraint, and determining a backtracking route based on the cone of visibility. Visualization data may be generated based on the backtracking route, resulting visualizations meant to guide a user back to an origin location.

21 Claims, 9 Drawing Sheets

(52) U.S. Cl.
CPC ..... *G01C 21/3632* (2013.01); *G01C 21/3638* (2013.01); *G01C 21/3641* (2013.01); *G01C 21/365* (2013.01)

(58) Field of Classification Search
CPC ............ G01C 21/3415; G01C 21/3484; G01C 21/3617; G01C 21/3641
USPC ........ 701/431–436, 439, 442–443, 448, 457, 701/467, 472, 487, 491, 515, 521, 526, 701/527, 538, 539, 541
See application file for complete search history.

(56) References Cited

U.S. PATENT DOCUMENTS

| | | | | |
|---|---|---|---|---|
| 8,965,688 | B2 * | 2/2015 | Bandyopadhyay .... | G01C 17/38 701/1 |
| 12,435,990 | B2 * | 10/2025 | Kruse ..................... | G10L 15/22 |
| 2007/0035563 | A1 * | 2/2007 | Biocca .................. | G06F 3/0346 345/633 |
| 2012/0310530 | A1 * | 12/2012 | Lee .................... | G01C 21/3697 701/465 |
| 2020/0326199 | A1 * | 10/2020 | Hendrix ................... | H04R 5/04 |
| 2023/0175861 | A1 | 6/2023 | Gunther et al. | |
| 2025/0109949 | A1 * | 4/2025 | Figueroa ............ | G01C 21/3415 |

OTHER PUBLICATIONS

Zhang, J., Xia, X., Liu, R., Li, N., 2021. Enhancing human indoor cognitive map development and wayfinding performance with immersive augmented reality-based navigation systems. Adv. Eng. Inf. 50, 101432. (Year: 2021).*

F. Xu, T. Zhou, T. Nguyen, and J. Du. Augmented reality in team based search and rescue: Exploring spatial perspectives for enhanced navigation and collaboration. Safety Science, 176:106556, 2024. doi: 10.1016/j.ssci.2024.106556 1 (Year: 2021).*

European Search Report in European Application No. EP25225136, mailed May 15, 2026, pp. 1-9.

Bhattarai Manish Lai et al., “Integrating Deep Learning and Augmented Reality to Enhance Situational Awareness in Firefighting Environments” XP093396636, pp. 1-170.

* cited by examiner

WEARABLE PERSONAL INSIDE-OUT LOCATION TRACKING

BACKGROUND OF INVENTION

In high stress and sometimes hazardous environments—firefighting, accident scene, search and rescue, disaster relief, mining, police or military operation, special operations, and crowded or hectic public consumer areas, and the like—emergency response personnel and other users often need to navigate in low-visibility environments with unknown hazards and unpredictable or unfamiliar physical obstacles, such as buildings with damaged or collapsed structures or temporary pop-up consumer environments (e.g., large outdoor fairs and markets, warehouse buildings with many different vendors or unfamiliar dividing structures). In many environments (e.g., hazardous, disaster, distracting environments) it may be very difficult to navigate into and out of such environments using conventional navigation tools.

Many conventional existing location tracking solutions require outside-in location tracking infrastructure, relying on external location services, such as GPS. Other known camera-based inside-out team location tracking systems assume high-quality visible light images (i.e., for extracting sparse features, which are used for matching across time in order to estimate camera motion and scene structure). However, many environments (e.g., hazardous or disaster environments in which emergency responders and critical workers often need to operate, warehouse stores, large fairs or markets) typically have poor access to external location services and/or cannot accommodate the capture of high-quality visible light images in real time, these conventional solutions are of limited use to them.

Thus, there is a need for wearable personal inside-out location tracking.

BRIEF SUMMARY

The present disclosure provides techniques for a wearable personal inside-out location tracking system. A system for a wearable personal inside-out location tracking system include: an augmented reality optic system comprising a hands-free wearable display positioned to be within a field of view of a user; a plurality of sensors comprising at least a camera and an inertial sensor; an input component comprising one or both of a button and a microphone; and a personal computing system configured to implement an inside-out personal location tracking feature to generate a backtracking route based on a cone of visibility determined by application of a parametric model to a personal navigation history generated by the inside-out personal location tracking feature, wherein the hands-free wearable display is configured to present a visualization associated with the backtracking route. In some examples, the personal computing system is further configured to initialize the user's personal navigation history. In some examples, the personal navigation history comprises a first-in-first-out (FIFO) queue. In some examples, the personal computing system is further configured to insert into the FIFO queue a pair comprising 3D coordinates and an axis-angle vector for each waypoint generated by the tracking system, thereby building a sequence of waypoints into the FIFO queue. In some examples, the user's personal navigation history comprises a sequence of waypoints, wherein each waypoint is at least a minimum allowable time apart and a minimum distance apart. In some examples, the parametric model comprises a set of egocentric visibility constraints, the set of egocentric visibility constraints comprising an angular threshold, a minimum distance parameter, and a maximum distance parameter, the minimum distance parameter comprising a threshold minimum distance from a current camera center and the maximum distance parameter comprising a threshold maximum distance from the current camera center. In some examples, the parametric model further comprises a set of environment constraints. In some examples, the personal computing system is further configured to prune the personal navigation history to generate the cone of visibility. In some examples, the backtracking route is configured to guide the user to a waypoint within the cone of visibility. In some examples, the personal computing system is further configured to track the user's proximity to an initial waypoint. In some examples, the personal computing system is further configured to track the user's orientation relative to an initial reference orientation.

A method for personal inside-out location tracking may include: initializing a personal navigation history comprising a first-in-first-out (FIFO) queue; inserting into the FIFO queue a plurality of waypoints in an order in which they are generated by a personal tracking system, thereby building a sequence of waypoints into the FIFO queue, the sequence of waypoints representing the user's personal navigation history, wherein each waypoint in the FIFO queue is at least a minimum allowable time apart and a minimum distance apart; generating a cone of visibility by pruning the user's personal navigation history according to a parametric model representing both an egocentric visibility constraint and an environment constraint; and determining a backtracking route based on the cone of visibility. In some examples, the method also includes generating visualization data configured to cause a visualization associated with the backtracking route to be presented on a display. In some examples, the environment constraint comprises a map point. In some examples, the map point represents an occlusion. In some examples, the egocentric visibility constraint comprises an angular threshold, a minimum distance parameter, and a maximum distance parameter, the minimum distance parameter comprising a threshold minimum distance from a current camera center and the maximum distance parameter comprising a threshold maximum distance from the current camera center. In some examples, each waypoint comprises a set of 3D coordinates and an axis-angle vector. In some examples, the visualization comprises a compass. In some examples, the visualization comprises an icon. In some examples, the visualization comprises a banner.

BRIEF DESCRIPTION OF THE DRAWINGS

Various non-limiting and non-exhaustive aspects and features of the present disclosure are described herein below with references to the drawings wherein.

Figure 1A:
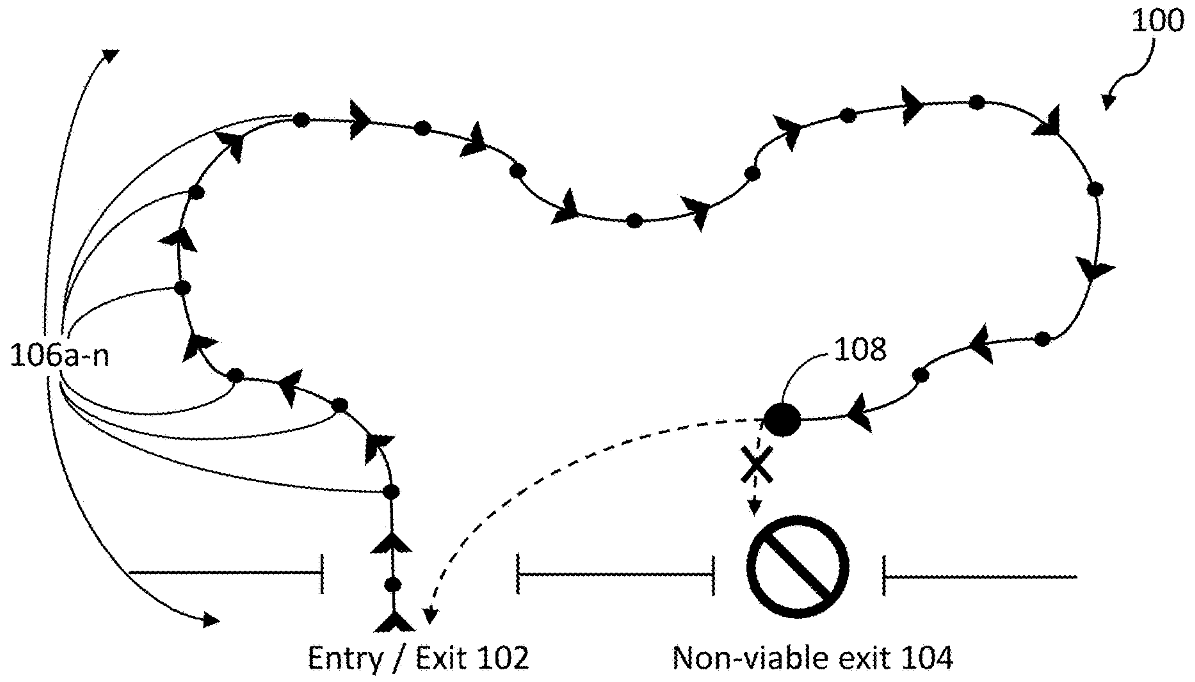
FIGS. 1A-1B are diagrams illustrating exemplary use cases for a wearable personal inside-out location tracking system, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The invention comprises a wearable inside-out location tracking system operative in low-visibility environments (e.g., dark, smoke-filled, or otherwise visibility impaired environments) wherein external location services are ineffective (e.g., not sufficiently accurate) or unavailable. The wearable inside-out location tracking system may comprise augmented reality optics, a camera, inertial sensors, and a personal computing system. Augmented reality optics may comprise a hands-free wearable display (e.g., HUD) configured to provide visualizations of information associated with a user's navigation history and path recommendations, including an egocentric perspective of the user and guidance between waypoints (e.g., "crumbs" back to an entry point or to another viable exit along a user's historical traveled path). The wearable system may further comprise buttons (e.g., physical, haptic), microphones, or other means, for providing inputs to the hands-free wearable display, for example to initiate a personal inside-out location tracking feature, to respond to alerts and other notifications, to switch or toggle between modes or views, to initiate an emergency signal (e.g., man-down alert, wireless beacon, etc.) and the like.

The personal computing system may be configured to implement a personal inside-out location tracking feature configured to track a user's path in a given environment (e.g., a building, a disaster area, other dangerous environments with low visibility and/or many obstacles) and lead the user back to safety (e.g., by route backtracking). The personal computing system may be configured to efficiently store and retrieve a complete history of a user's personal navigation history from when the personal inside-out location tracking feature is initiated (e.g., locally by the user, remotely by instruction from a command device, or automatically upon sensing certain conditions). The personal computing system may comprise logic for pruning the user's personal navigation history to enable safe and efficient route backtracking. Refined mapping and tracking data from an inside-out location tracking and mapping system (e.g., stored in an associative data structure, such as a tracking grid) may be leveraged to assist a user in finding a path back to a given entry point, or to another viable exit along the user's personal navigation history, in an unknown low-visibility environment.

An initialization of the personal inside-out location tracking feature may clear any previous navigation history, populate the user's navigation history with a set of 3D zero coordinates {0; 0; 0}, and assign an initial reference orientation. The 3D zero coordinates and the initial reference orientation may comprise an initial (i.e., origin) waypoint. In some examples, the wearable system may be configured to sense a geomagnetic North, in which case the initial orientation may be set relative to the geomagnetic North. In other examples, an initial orientation may be set to an egocentric North comprising the user's heading at the time of initialization. After initialization, subsequent waypoints (i.e., "crumbs") may be inserted into a First-In-First-Out (FIFO) queue as pairs of 3D coordinates and axis-angle vectors. This FIFO may facilitate a "look-back" operation over the personal navigation history. In some examples, logic for inserting a crumb into the user's personal navigation history FIFO queue comprises the following criteria:

- a parameter $dt_{min}$ is defined to represent a minimum allowable time between crumb insertions, such that a rate of insertion of crumbs matches a timescale of human behavior;
- a parameter $dist_{min}$ is defined to represent a minimum distance between crumbs matched to a length scale of human behavior.

The look-back operation may be configured to safely prune the FIFO navigation history queue by examining a set of crumbs in the queue associated with a predetermined look-back window size. Starting from the most recent crumb and working backwards in time, each crumb in the FIFO navigation history queue is inspected for inclusion into a cone of visibility relative to a current camera state. The cone of visibility comprises a model of the user's gaze direction. The cone of visibility may be defined by parameters $$dist^{cv}_{min} \text{ and } dist^{cv}_{max},$$

corresponding to a minimum and maximum distance, respectively, that a crumb can be from a current camera center to be considered within the cone of visibility. Together they define an acceptable distance margin. Another parameter, $\theta_v$, may comprise an angular threshold for determining whether a crumb within the look-back window falls within the cone of visibility. Crumbs that take an angle below the angular threshold relative to the user's current camera z-axis $z^w$, in the world frame, may be included. The angle between each interrogated crumb, $c^i$, and the positive z-axis of the camera in the world frame, $z^w$, may be estimated as:

$$\theta_v^i = a\cos\left( < z^w, \frac{c^i}{\|c^i\|} > \right)$$

where:

<•,•> comprises the inner or "dot" product between 3D vectors $z^w$ comprises the world frame camera z-axis $c^i$ and $\|c^i\|$ comprises the $i^{th}$ crumb and its norm, respectively.

In addition to an egocentric visibility constraint (e.g., the cone of visibility), the personal location tracking feature may further consider environment constraints in the form of map points from a sparse mapping backend or dense voxel surface model. For example, a definition of an environment constraint may comprise a map point location, a unit vector at the map point representing an average (or other statistic) of the viewing angles over previous observations of the environment constraint, and a constraint function for evaluating whether a crumb is occluded by the environment constraint. In some examples, a map point may be included if its location falls within the cone of visibility—the angle of its unit vector does not exceed an angular threshold, i.e., $$\theta_v^i < \theta_v,$$

relative to the user's current camera z-axis and its unit vector aligns with a current camera axis$\pm\theta_m$. In other examples, an environment constraint may be provided by a different means (e.g., different kind of map). An environment constraint comprises an occlusion within the cone of visibility if it is both visible and oriented towards the user. In other words, the cone of visibility constrains the set of crumbs for a backtracking route to only those that fall within a parametric model that captures both egocentric viewing and environment constraints. For a crumb to be included in the cone of visibility, it must (a) have an $$\theta_v^i < \theta_v,$$

(b) have a distance from a current camera that is within the acceptance margin $$dist_{min}^{cv} < \|cam^w - c^i\| < dist_{max}^{cv},$$

and (b) not be occluded by any environment constraints within the cone of visibility.

The personal location tracking feature also may define when a user has departed from an initial waypoint and when they have returned to an initial waypoint. In some examples, the user has departed when they are a distance of $\alpha$*$dist_{min}$ away from the initial waypoint and has returned when they are a distance of $\beta$*$dist_{min}$ away from the initial waypoint.

The personal location tracking feature may output a variety of visualizations to a user's hands-free wearable display to provide the user with useful information for navigating within the given environment. A visualization may comprise an indication of a bearing towards a next recommended crumb, a proximity indicator to the next recommended crumb, a tracking status (e.g., initiated, departed, returned, tracking failure, backtracking route re-acquisition, etc.), a compass, an indication of an exit or entrance, other alert or notification, and any combination thereof. The visualization may be presented in an egocentric perspective of the user to enable efficient and intuitive navigation. In some examples, the visualization may also comprise a partial trajectory of the user's remaining navigation history (e.g., a backtracking trajectory), up to occlusion by environment constraints. In some examples, the visualization may present a user's backtracking trajectory in terms of crumb locations. Alternatively, or in addition, the visualization may present interpolations in between crumb locations. In an example, a HUD may render a user's backtracking trajectory from the user's egocentric perspective—the visualization displaying the user's orientation relative to a next crumb along their route. In some examples, the visualization may also provide visual cues indicating the user's backtracking trajectory. The visualization may reflect a combination of crumb and environment constraints processed within a cone of visibility. A hands-free wearable display may provide visualizations in 2D or 3D (e.g., map graphics, compass graphics, augmented reality graphics).

Figure 1B:
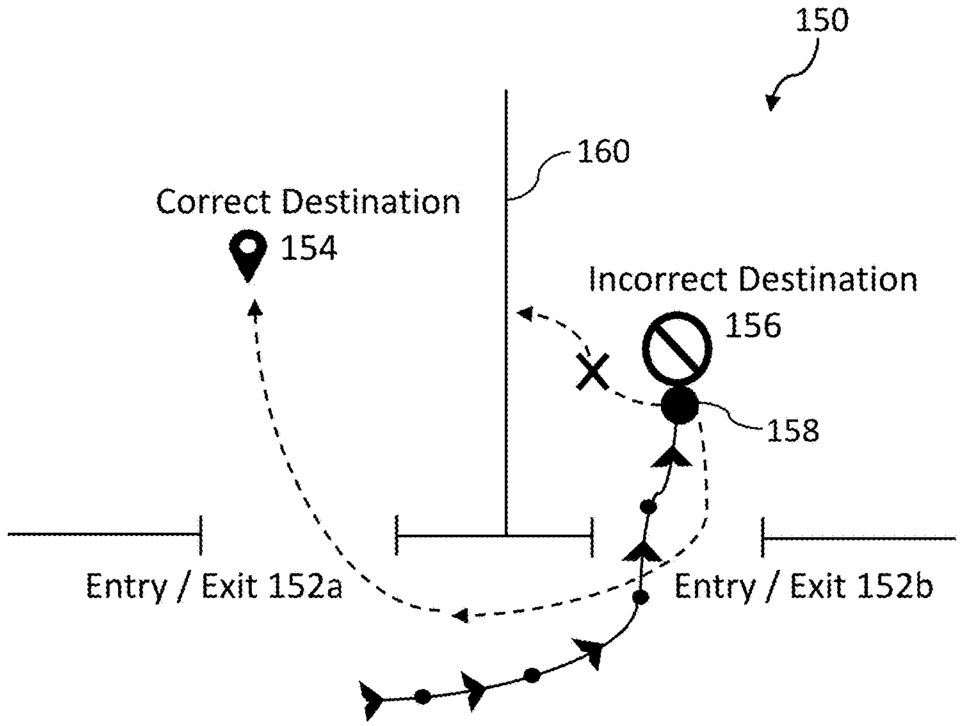

FIGS. 1A-1B are diagrams illustrating exemplary use cases for a wearable personal inside-out location tracking system, in accordance with one or more embodiments. In diagram 100, an environment is represented, the environment comprising entry/exit 102, a non-viable exit 104, a plurality of waypoints **106*a*-106*n*, and a current location 108. In an example use case, a first responder or emergency response personnel may be operating in an unfamiliar, GPS-denied environment (e.g., indoor structures) with low visibility (e.g., due to fire, smoke, flooding, collapsed structures, etc.). It may be difficult for a user to determine a return path to entry/exit 102 or to distinguish between non-viable exit 104 (e.g., an obstructed exit, a window, other opening that is not safe for exit) and entry/exit 102. In diagram 150, another environment is represented, this other environment comprising entry/exits 152*a*-152*b*, a correct destination 154, an incorrect destination 156, a current location 158, and an obstacle 160 (e.g., a temporary or permanent wall, a row of vendors, a fence, or other barrier). In an example use case, a user may be navigating in an unfamiliar retail setting (e.g., large scale, temporary, crowded) with multiple entry/exit points 152*a*-152*b* and many similar-looking destinations (e.g., shops, kiosks, tents, etc.). A user may desire high-resolution (e.g., high speed, high detail) personal navigation to correct destination 154, especially after entering an area with incorrect destination 156, it may be difficult to find a way back out through entry/exit 152*b* and into entry/exit 152*a* to correct destination 154**. In both of these examples, a personal inside-out location tracking system, as described herein, would be useful in navigating back out of a viable entry/exit point.

Figure 2A:
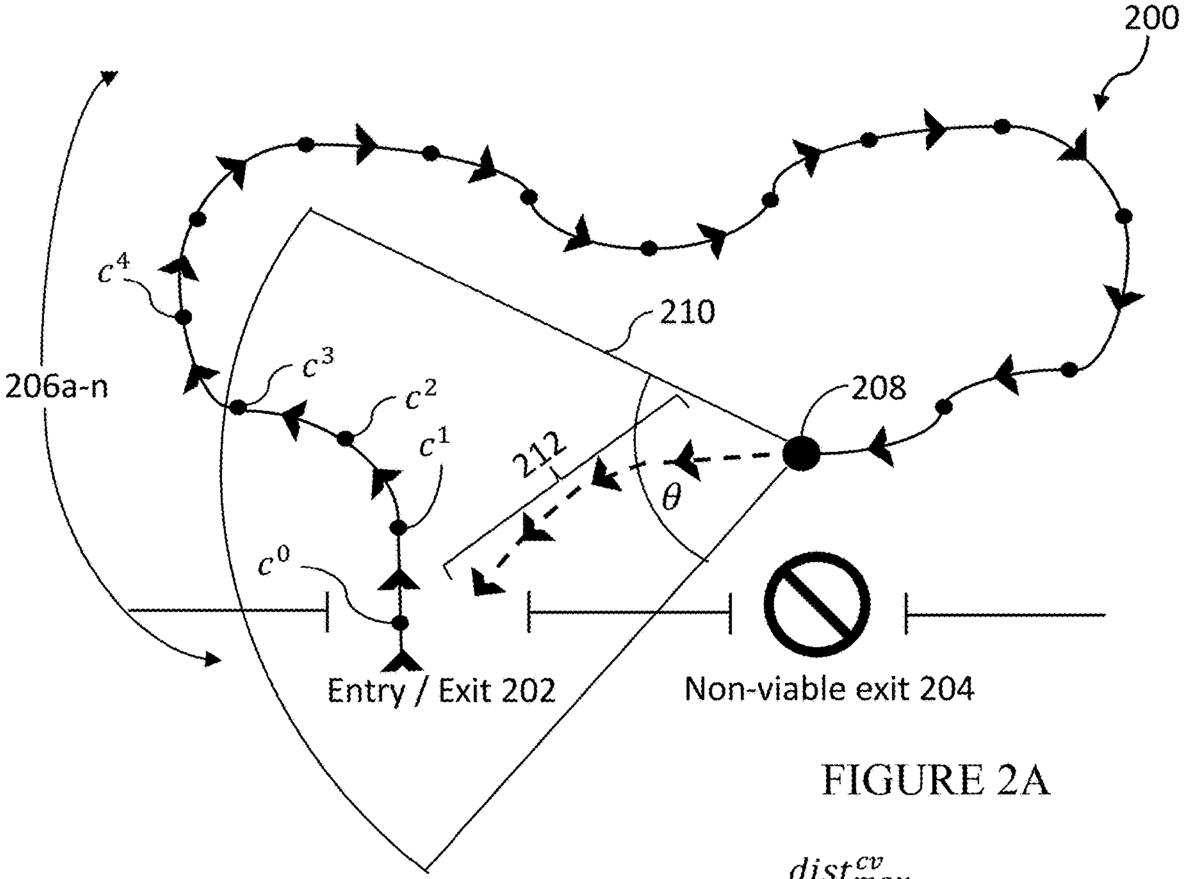
FIG. 2A is a diagram illustrating an exemplary cone of visibility determined by a wearable personal inside-out location tracking system, in accordance with one or more embodiments.

FIG. 2A is a diagram illustrating an exemplary cone of visibility determined by a wearable personal inside-out location tracking system, in accordance with one or more embodiments. In diagram 200, an environment is represented, the environment comprising entry/exit 202, a non-viable exit 204, a plurality of waypoints **206*a*-206*n*, and a current location 208. The plurality of waypoints 206*a*-206*n*** may comprise a series of stored waypoints representing a user's personal navigation history in this environment. A personal inside-out location tracking system may be configured to retrieve and prune the user's personal navigation history to generate cone of visibility 210 comprising a subset of waypoints $c^0$ to $c^3$, wherein waypoints $c^4$ and beyond lie outside of the cone of visibility 210. Pruning the user's personal navigation history may comprise inspecting each waypoint for inclusion into the cone of visibility (e.g., according to a model as described herein) starting from the most recent crumb and working backwards in time (e.g., a look-back operation as described herein). The personal inside-out location tracking system may be configured to recommend an efficient backtracking route 212 for the user at current location 208, first towards $c^2$ or $c^1$, and possibly later towards c, as a way back out of entry/exit 202.

In some examples, a personal inside-out location tracking system may be initialized/activated (e.g., turned on manually or automatically) when a user enters the environment through entry/exit 202. In some examples, manual activation may be achieved by a button press or a voice command. In other examples, there may be automatic activation when certain conditions are met (e.g., sensors detect low-visibility or otherwise hazardous conditions), or activation may be implemented using a remote device (e.g., a remote command device being used by a remote user). In some examples, initialization may comprise clearing the system storage/memory of any previous navigation history and populating it with 3D zero coordinates—{0; 0; 0}. In some examples, initialization also may comprise assigning an initial reference orientation. The initial reference orientation may be set in reference to a geomagnetic North, or the initial reference orientation may simply be an egocentric "North" setting using a user's heading at the time of initialization. In either case, subsequent waypoints may be inserted into a FIFO queue with reference to the initial reference orientation. The FIFO queue may comprise pairs of (a) 3D coordinates and (b) axis-angle vectors. Waypoints 206*a*-206*n* may be added to the FIFO queue at time intervals according to parameter $dt_{min}$ and distance intervals according to $dist_{min}$.

Figure 2B:
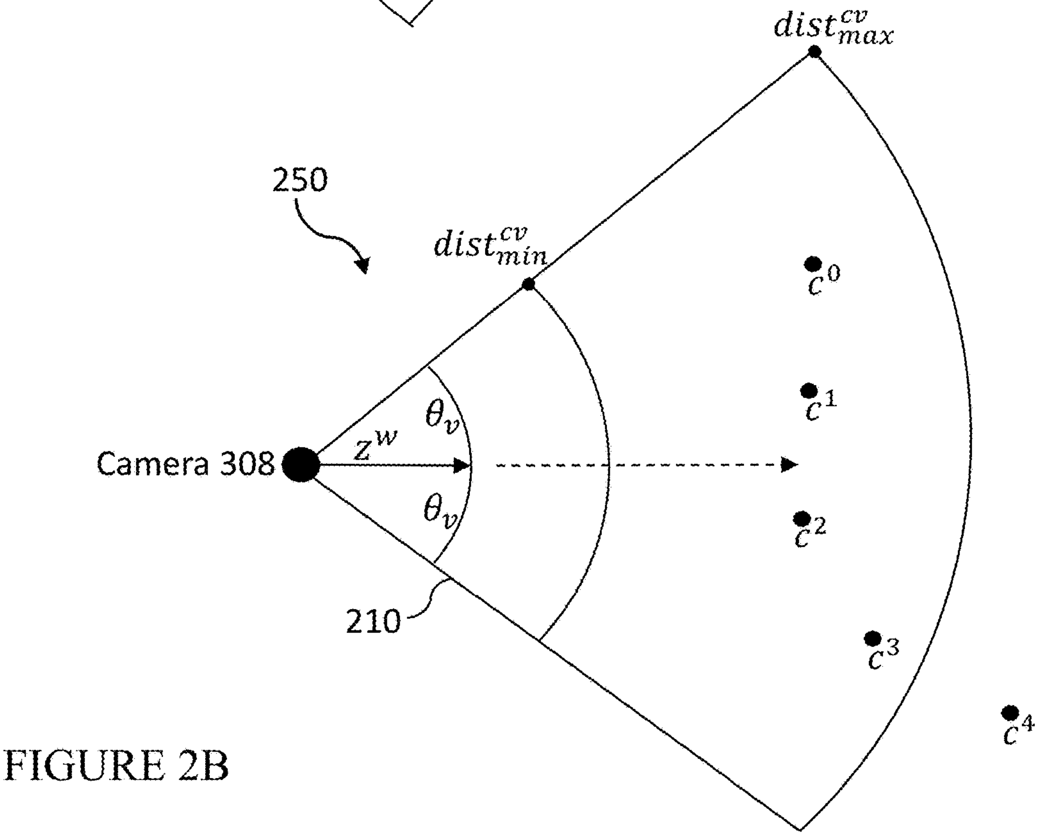
FIG. 2B comprises a 2D graph of features of the cone of visibility in FIG. 2A, in accordance with one or more embodiments.

The FIFO queue facilitates a convenient "look-back" operation over a user's personal navigation history from a present (i.e., current) location to past locations when a backtracking route is desired, the look-back operation iterating backwards from an output end of the queue (e.g., waypoint 206*n* being the most recent waypoint going back from current location 208). The look-back operation may be performed in response to an initiation of a backtracking feature, wherein each of waypoints 206*a*-206*n* may be inspected to determine whether that waypoint should be included in a cone of visibility. The cone of visibility comprises a model of a user's gaze, and therefore is defined relative to a current camera state, wherein the camera view is in the same or similar direction as the user's gaze. FIG. 2B comprises a 2D graph of features of the cone of visibility in FIG. 2A, in accordance with one or more embodiments. The cone of visibility is defined by the parameters minimum distance from a current camera center $$dist_{min}^{cv},$$

maximum distance from a current camera center $$dist_{max}^{cv},$$

and angular threshold $\theta_v$. As described above, angular threshold $\theta_v$ is relative to a positive z-axis of the camera $z^w$ in the world frame. As shown, the subset of waypoints subset of waypoints $c^0$ to $c^3$ are within the cone of visibility 210 as defined by $$dist_{min}^{cv},\ dist_{max}^{cv},$$

and $\theta_v$ relative to $z^w$, whereas $c^4$ is outside the cone of visibility 210.

Figure 3:
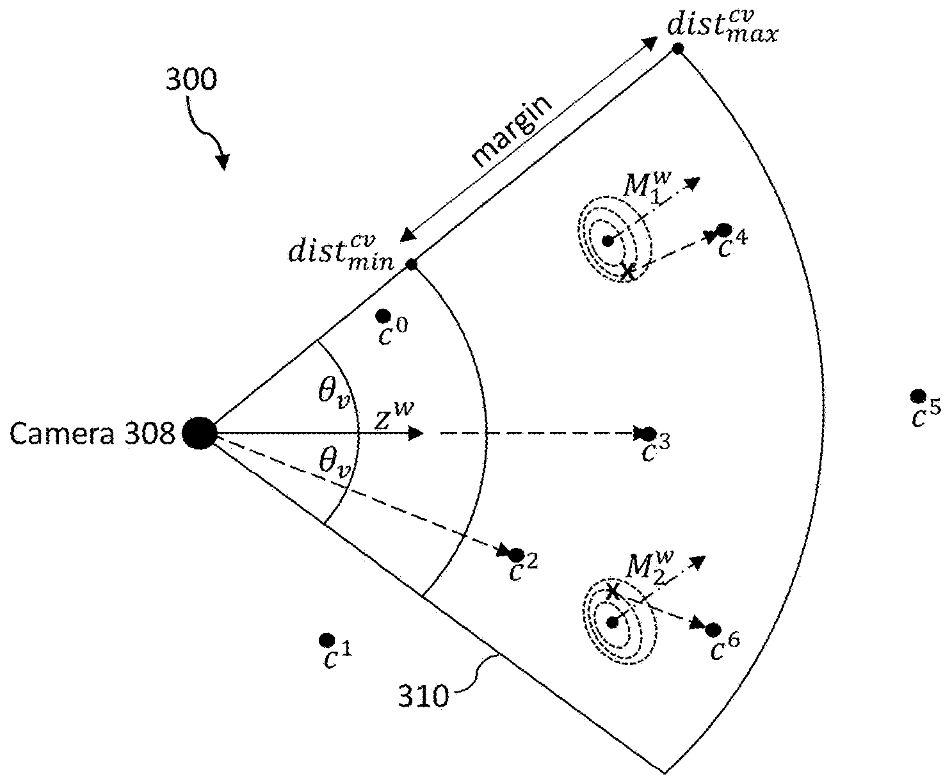
FIG. 3 is a more detailed 2D graph illustrating an exemplary cone of visibility, in accordance with one or more embodiments.

FIG. 3 is a more detailed 2D graph illustrating an exemplary cone of visibility, in accordance with one or more embodiments. In graph 300, waypoints $c^i$, i={0, 1, 2, 3, 4, 5, 6}, may be evaluated by a personal location tracking system in reverse chronological order for inclusion in cone of visibility 310 relative to $z^w$, which is based on an orientation/gaze of camera 308. Waypoints $c^2$, $c^3$, $c^4$, and $c^6$ all meet the angular constraint $\theta_v$ and fall within the acceptable distance margin between $$dist_{min}^{cv} \text{ and } dist_{max}^{cv}.$$

Waypoint $c^1$ does not meet the angular constraint and waypoints $c^0$ and $c^5$ fall outside of the acceptable distance margin. Waypoints $c^4$ and $c^6$, however, are occluded by environment constraints $$M_1^w \text{ and } M_2^w,$$

respectively. In some examples, $$M_1^w \text{ and } M_2^w$$

may represent physical obstacles in a user's world view (e.g., walls and other barriers). As described herein, environment constraints may comprise map points from a sparse mapping backend or dense voxel surface model, or may be provided by other means (e.g., different maps, previous observations using camera 308). In some examples, the orientations of $$M_1^w \text{ and } M_2^w$$

(e.g., as shown by the dashed-dotted vector arrows) may have been recorded and stored previously from one of these sources and may be retrieved as the personal location tracking system performs the look-back operation to generate the cone of visibility. The dashed line arrows indicate orientations of $c^2$, $c^3$, $c^4$, and $c^6$ relative to camera 308. In some examples, $c^2$ may be selected as the waypoint within the cone of visibility toward which the personal location tracking system will first recommend a path to as its closer proximity to camera 308 may represent a safer trajectory. In other examples, a next path recommendation after the user nears or reaches $c^2$ may be towards $c^3$. In still other examples, the personal location tracking system may re-evaluate the cone of visibility at a next current location at or near $c^2$.

In some examples $c^0$ and $c^1$ may be pruned from the user's personal navigation history queue for purposes of generating a backtracking route. If there were more waypoints prior to $c^2$, those also would be pruned up to $c^2$. Furthermore, while waypoints $c^4$ through $c^6$ were censored at this iteration, they are not pruned because they may be valid upon subsequent iterations as a user moves towards them. In some examples, the personal location tracking system may implement a departed and returned feature (e.g., with respect to a home/entry/initial waypoint/location), as described above.

Figure 4A:
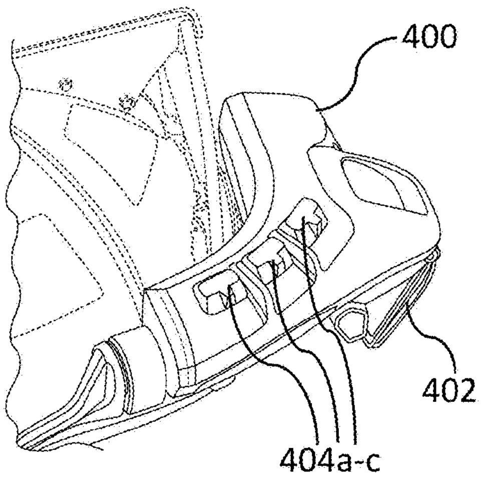
FIGS. 4A-4B are diagrams illustrating exemplary wearable vision modules comprising input buttons and a hands-free wearable display, in accordance with one or more embodiments.
Figure 4B:
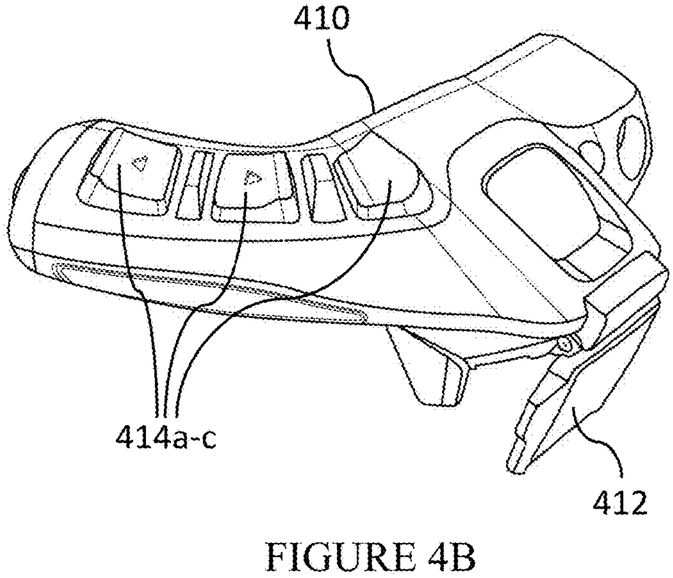

The resulting backtracking route, or portions thereof, may be presented in visualizations on a hands-free wearable display. FIGS. 4A-4B are diagrams illustrating exemplary wearable vision modules comprising input buttons and a hands-free wearable display, in accordance with one or more embodiments. Wearable vision modules 400 and 410 may each comprise buttons 404*a*-404*c* and 414*a*-414*c*, respectively. Wearable vision modules 400 and 410 also may each comprise a hands-free wearable display (e.g., HUD) 402 and 412, respectively. In some examples, wearable vision modules 400 and 410 further may comprise personal computing systems, as described herein. In some examples, one or more of buttons 404*a*-404*c* may be configured to control aspects of visualizations provided to HUD 402, and one or more of buttons 414*a*-414*c* may be configured to control aspects of visualizations provided to HUD 412. In some examples, one or more of buttons 404*a*-404*c* and 414*a*-414*c* may be configured to control other aspects of a personal location tracking system, such as initialization, modes, map type, re-routing, notification scrolling, notification acknowledgement, toggling between screens or views, and the like. In other examples, one or more of buttons 404*a*-404*c* and 414*a*-414*c* may be configured to control other functions of a wearable vision module. In some examples, wearable vision modules 400 and 410 also may comprise one or more sensors, including a camera (e.g., a thermal imaging camera (TIC), a radiometric thermal camera, other visual sensor) and an inertial sensor (e.g., inertial monitoring unit (IMU)), the data from which may be used in a personal location tracking system as described herein. In some examples, HUD 402 and HUD 412 may be positioned within a field of view of a user when vision modules 400 and 410 are worn (e.g., mounted to a helmet or other head gear being worn by a user).

Figure 5:
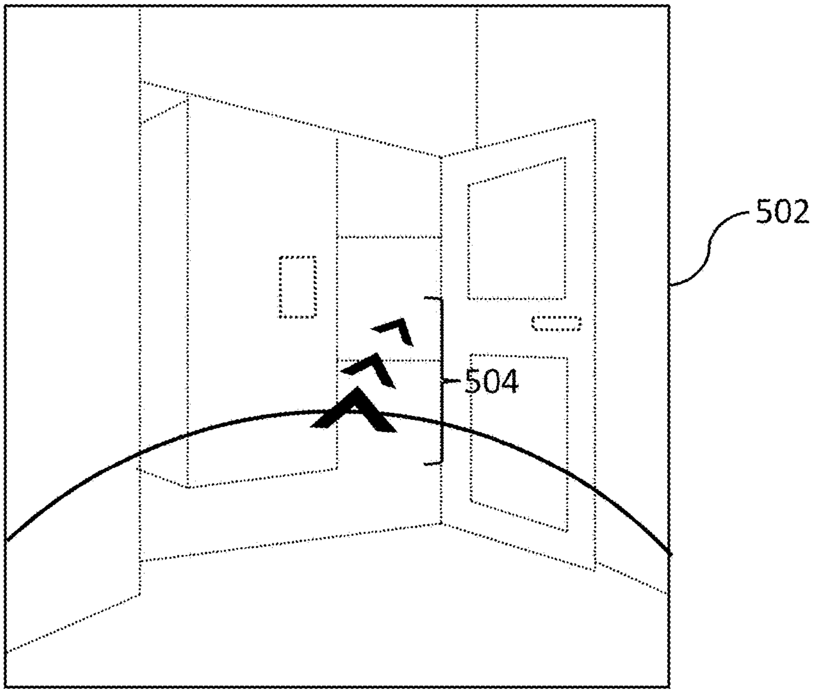
FIG. 5 is a simplified diagram of an exemplary display associated with a backtracking route generated using a personal navigation history, in accordance with one or more embodiments.

HUD 402 and HUD 412 may be configured to display a variety of visualizations, including visualizations relating to a backtracking route generated by a personal location tracking system, as described herein. FIG. 5 is a simplified diagram of an exemplary display associated with a backtracking route generated using a personal navigation history, in accordance with one or more embodiments. An exemplary display 502 (e.g., a hands-free wearable display) may show to a user a visualization of an environment (e.g., dotted line picture showing a door leading to a hallway or a room) superimposed with a compass 504 (e.g., indicating a horizon arc line and chevrons pointing toward a direction of the backtracking route. In some examples, the environment shown in display 502 may comprise an augmented reality representation of an actual environment in which the user is navigating.

Figure 6A:
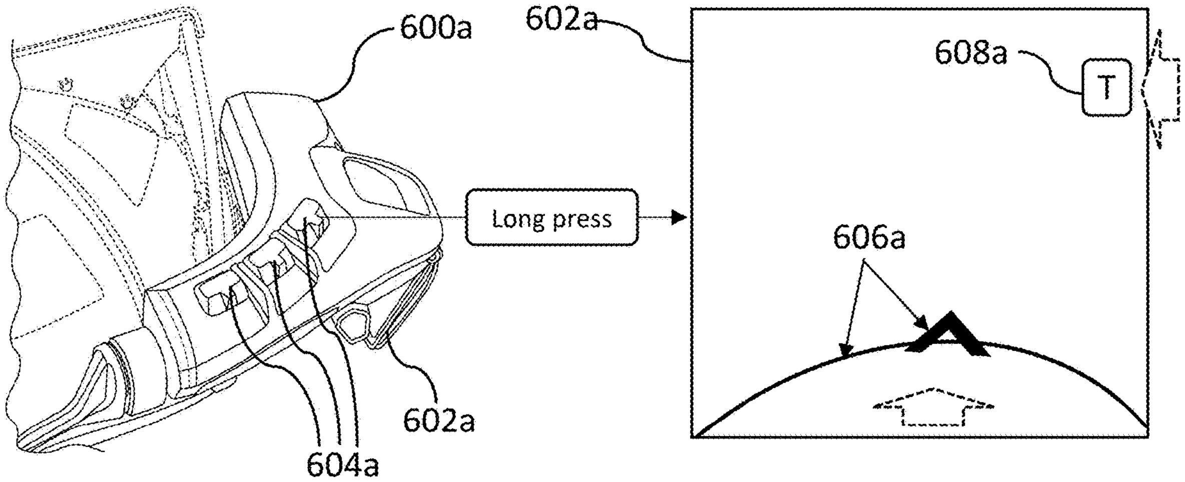
FIGS. 6A-6D are diagrams illustrating exemplary augmented reality optics, in accordance with one or more embodiments.

FIGS. 6A-E are diagrams illustrating exemplary augmented reality optics, in accordance with one or more embodiments. In some examples, an example augmented reality optics system may comprise a wearable vision module (e.g., vision modules 600*a*-600*c*) comprising a hands-free wearable display (e.g., displays 602*a*-602*d*) and one or more buttons (e.g., buttons 604*a*-604*c*). As shown in FIG. 6A, a long press of one of buttons 604*a* may cause a personal location tracking system to initialize, as described herein, which may result in a compass 606*a* and tracking icon 608*a* to appear onto display 602*a*. In other examples, a personal location tracking system may be caused to initialize differently (e.g., by voice command, automatically, remotely). In some examples, compass 606*a* and tracking icon 608*a* may simply appear or they may animate into view (e.g., sliding in from various sides of the screen as shown by the dotted arrows, fading in, flashing, or other animated appearance) in response to an initialization of the personal location tracking system.

Figure 6B:
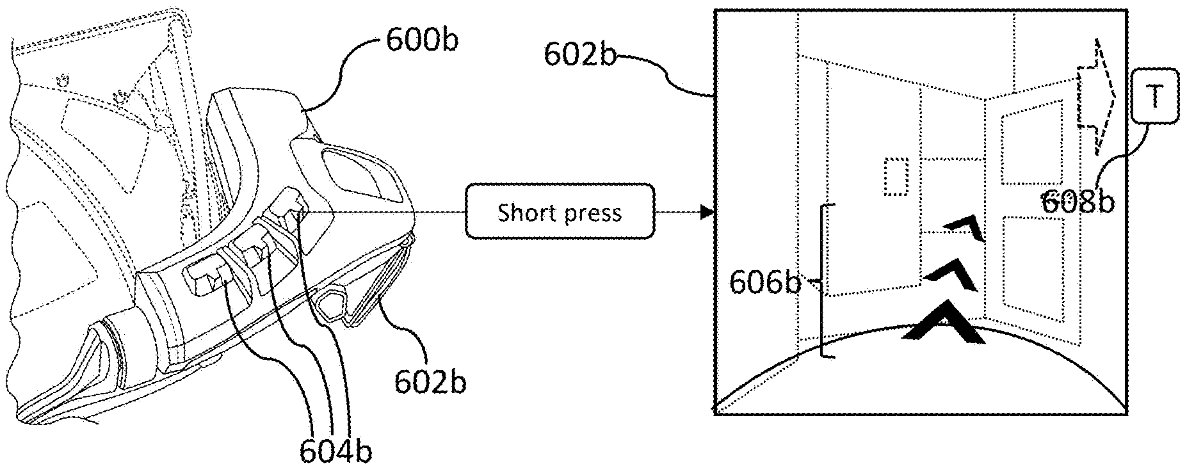

As shown in FIG. 6B, a short press of one of buttons 604*b* on wearable vision module 600*b* may cause a backtracking feature to be initiated, for example, when a user is ready to return to a point of entry (e.g., point of origin, entry/exit location). In some examples, when the backtracking feature is initiated, tracking icon 608*b* may disappear from display 602*b*, an augmented reality representation of the user's environment may appear, and compass 606*b* may change (e.g., color, format, shape) to better show directions relating to a backtracking route generated by a personal location tracking system, as described herein.

Figure 6C:
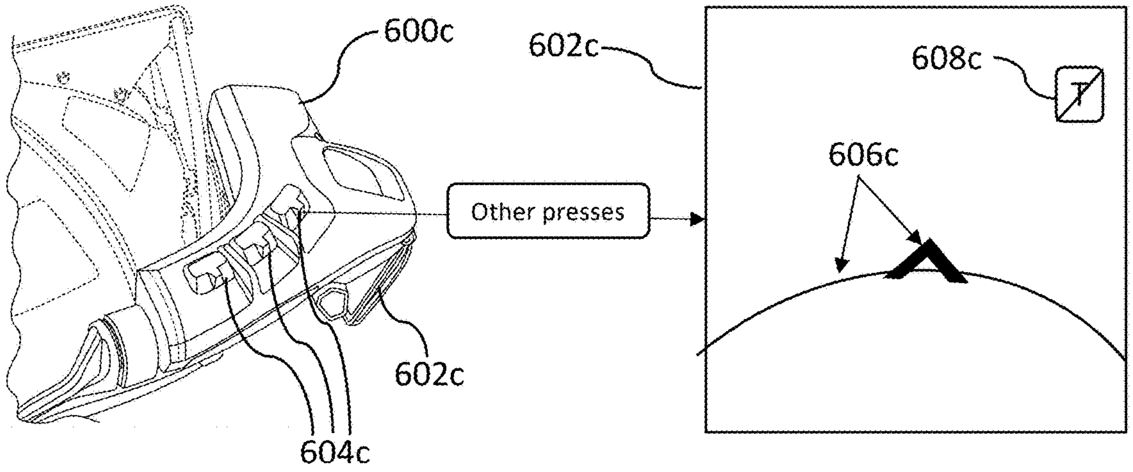

As shown in FIG. 6C, other presses (e.g., sequences or combinations of short or long, a sustained longer press, pressing more than one button at a time, etc.) of one or more of buttons 604*c* on vision module 600*c* may result in other actions and changes to the visualization shown on display 602*c* toggling between various modes. For example, such presses may toggle between the compass 606*b* and augmented reality environment on display 602*b* and another type of compass 606*c* (e.g., showing an orientation and/or distance relative to an initial orientation) or another type of display altogether (e.g., a map, an alert, etc.) that is not shown. In an example, if personal location tracking (e.g., building of the user's personal navigation history with addition of waypoints into the FIFO queue) fails, an inactive tracking icon 608*c* may be shown (e.g., a tracking icon with a slash through it) and a basic compass (e.g., showing a current orientation relative to an initial orientation or a "North" direction). In some examples, a user may use a button press to re-set navigation and/or location tracking.

Figure 6D:
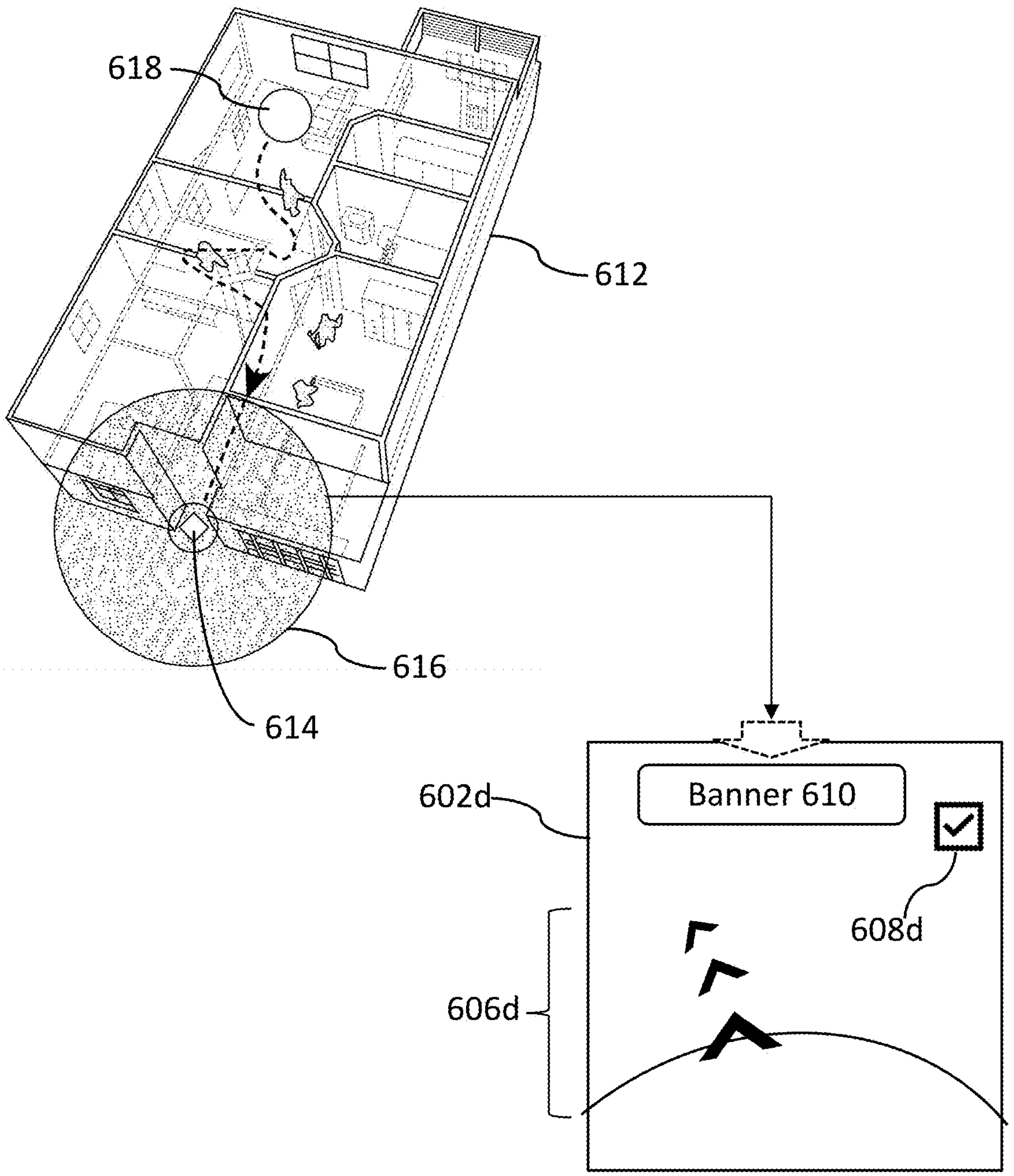

FIG. 6D illustrates a return indicator feature wherein backtracking compass 606*d* is displayed on display 602*d*, along with banner 610 and checkmark icon 608*d* configured to indicate a proximity to and/or arrival at an initial waypoint 614. In some examples, if a user has successfully navigated from a location 618 in environment 612 to within a threshold distance $\beta * dist_{min}$ from an initial waypoint 614 (e.g., a home point, point of origin, etc.), a banner 610 may be shown on display 602*d* to indicate to the user their proximity to initial waypoint 614. In some examples, tracking may no longer be necessary at this point, and a checkmark icon 608*d* may replace the tracking icons 608*a-c* as a further indication of proximity to, or arrival at, initial waypoint 614. In some examples, a user may turn off the personal location tracking system and/or the backtracking feature using a button press. In other examples, once the initial waypoint 614 is reached, the personal location tracking system may automatically stop tracking and the backtracking feature may automatically shut off.

In still other examples, various types of button presses may cause other actions to be performed by the personal location tracking system, such as re-setting tracking, re-setting navigation, performing system checks, and the like. While exemplary visualizations have been shown and described herein, one of ordinary skill in the art would understand that many other variations on the visualizations described herein are possible for indicating the actions, features, statuses, and notifications described herein, as well as for indicating other actions, features, statuses, and notifications.

Figure 7A:
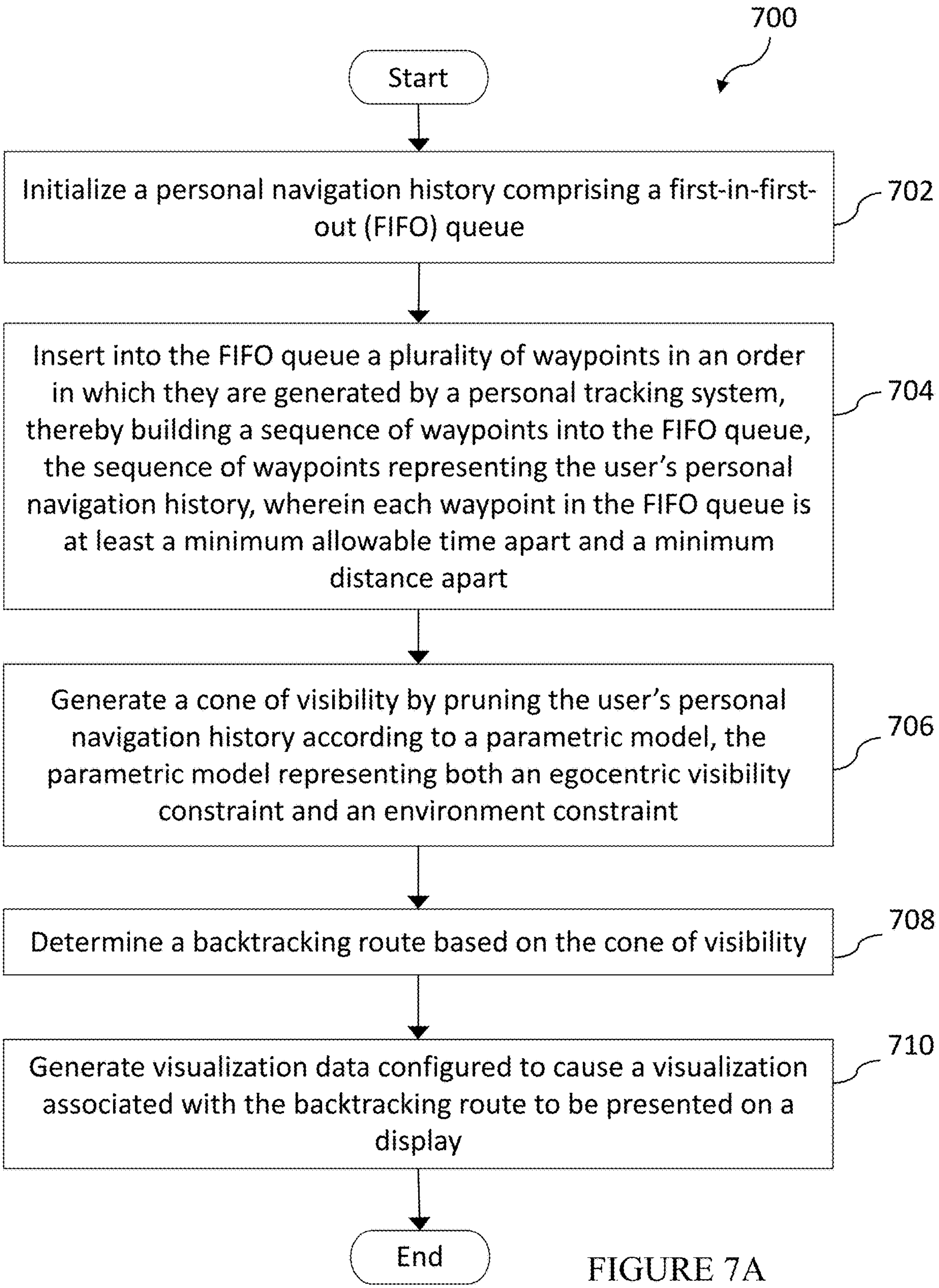
FIGS. 7A-7B are process flow diagrams illustrating exemplary methods for personal inside-out location tracking, in accordance with one or more embodiments.
Figure 7B:
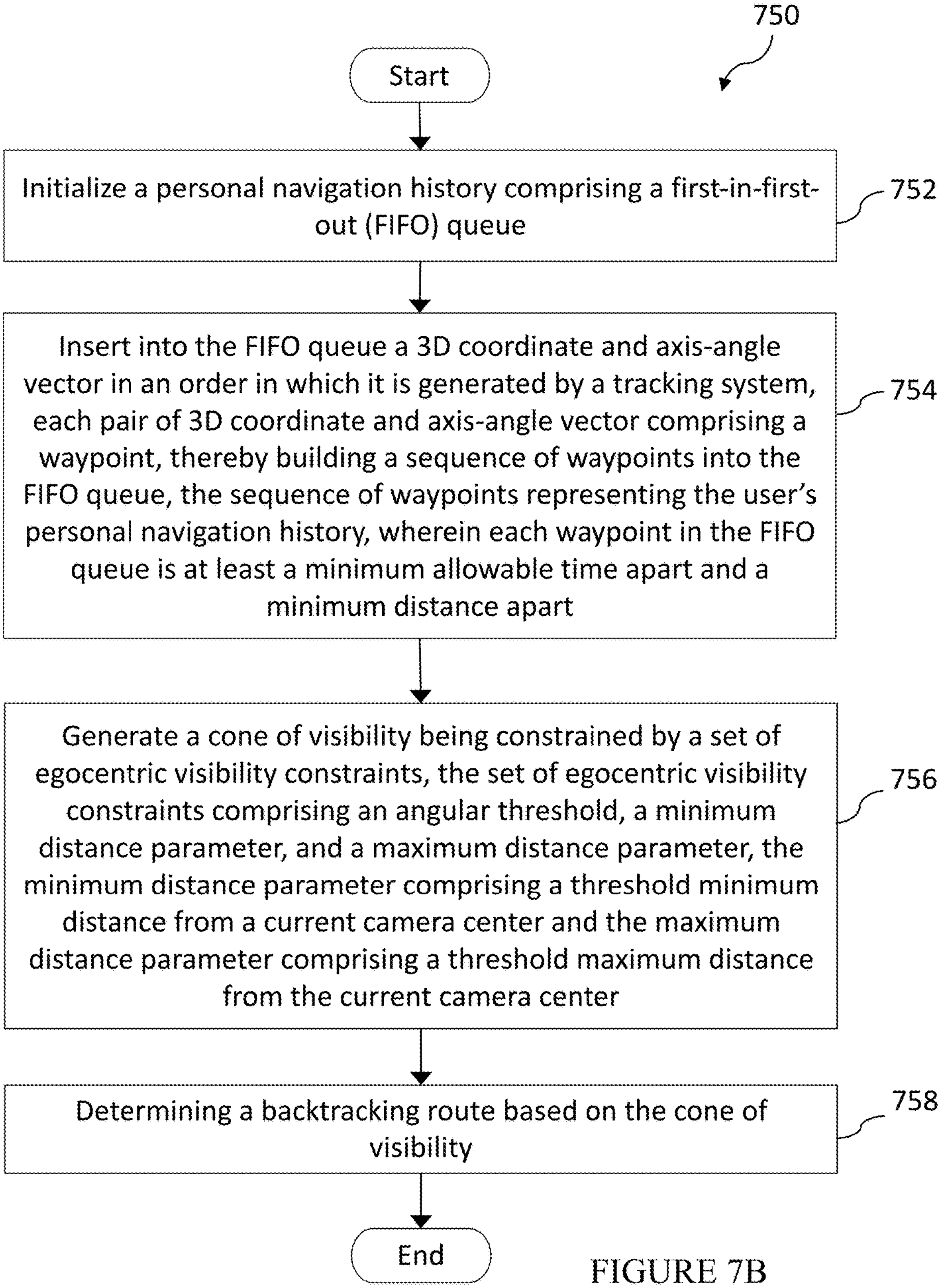

FIGS. 7A-7B are process flow diagrams illustrating exemplary methods for personal inside-out location tracking, in accordance with one or more embodiments. Method 700 may begin with initializing a personal navigation history comprising a first-in-first-out (FIFO) queue at step 702. In some examples, initializing the personal navigation history may comprise clearing any previous navigation history, populating the user's navigation history with a set of 3D zero coordinates {0; 0; 0}, and assigning an initial reference orientation. The 3D zero coordinates and the initial reference orientation may comprise an initial (i.e., origin) waypoint, subsequent waypoints being added relative to this initial waypoint. A waypoint may be inserted into the FIFO queue in an order in which it is generated by a personal tracking system at step 704, thereby building a sequence of waypoints into the FIFO queue, the sequence of waypoints representing the user's personal navigation history. In some examples, each waypoint in the FIFO queue is at least a minimum allowable time apart and a minimum distance apart. In some examples, each waypoint is stored as a pair comprising 3D coordinates and an axis-angle vector. A cone of visibility may be generated at step 706 by pruning the user's personal navigation history according to a parametric model, the parametric model representing both an egocentric visibility constraint and an environment constraint. In some examples, the egocentric visibility constraint is defined by an angular threshold relative to the user's camera z-axis and a distance margin between a minimum and maximum distance from the user's camera. In some examples, the environment constraint may comprise an occlusion (e.g., wall, collapsed structure, and other physical obstacle) provided by map points from a sparse mapping backend or dense voxel surface model or observed previously and tracked along with, and relative to, the user's personal navigation history. In some examples, pruning the user's personal navigation history may comprise inspecting the sequence of waypoints in reverse chronological order (e.g., from the most recent crumb and working backwards in time) for inclusion into the cone of visibility according to the parametric model. A backtracking route may be determined based on the cone of visibility at step 708. Visualization data may be generated at step 710, the visualization data configured to cause a visualization associated with the backtracking route to be presented on a display. In some examples, the display may comprise a hands-free wearable display configured to show an augmented reality representation of a user's environment with a compass indicating a backtracking route. In some examples, the display may be further configured to show additional icons and banners associated with a location tracking status, a return indication, and other features, statuses, and information. In some examples, the user's proximity to the initial waypoint may also be tracked, for example, to provide an indication to the user when they are within a threshold distance of the initial waypoint.

In FIG. 7B, method 750 also may begin with initializing a personal navigation history comprising a first-in-first-out (FIFO) queue at step 752. Method 700 may begin with initializing a personal navigation history comprising a first-in-first-out (FIFO) queue at step 702. In some examples, initializing the personal navigation history may comprise clearing any previous navigation history, populating the user's navigation history with a set of 3D zero coordinates {0; 0; 0}, and assigning an initial reference orientation. The 3D zero coordinates and the initial reference orientation may comprise an initial (i.e., origin) waypoint. A 3D coordinate and axis-angle vector may be inserted into the FIFO queue in an order in which it is generated by a tracking system at step 754, each pair of 3D coordinate and axis-angle vector comprising a waypoint, thereby building a sequence of waypoints into the FIFO queue, the sequence of waypoints representing the user's personal navigation history. In some examples, each waypoint in the FIFO queue is at least a minimum allowable time apart and a minimum distance apart. A cone of visibility may be generated at step 756, the cone of visibility being constrained by a set of egocentric visibility constraints, the set of egocentric visibility constraints comprising an angular threshold, a minimum distance parameter, and a maximum distance parameter, the minimum distance parameter comprising a threshold minimum distance from a current camera center and the maximum distance parameter comprising a threshold maximum distance from the current camera center. In some examples, the angular threshold also may be determined relative to the current camera center. In some examples, the cone of visibility may further be constrained by a set of environment constraints, as described herein. In some examples, the cone of visibility may comprise a subset of the sequence of waypoints pruned through inspection of the sequence of waypoints in reverse chronological order (e.g., from the most recent crumb and working backwards in time) for inclusion into the cone of visibility according to the set of egocentric visibility constraints. A backtracking route may be determined based on the cone of visibility at step 758. In some examples, the backtracking route may be used to generate visualizations to be presented on a display, as described herein. In some examples, the user's proximity to the initial waypoint may also be tracked, for example, to provide an indication to the user when they are within a threshold distance of the initial waypoint.

Figure 8A:
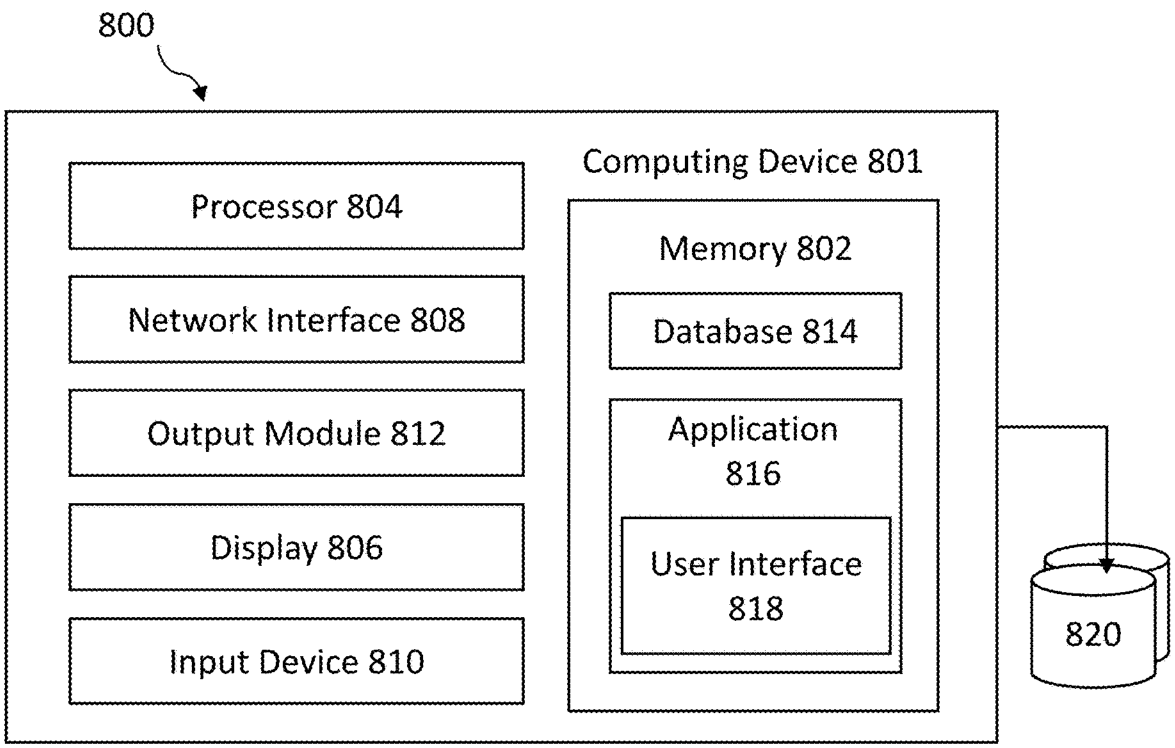
FIG. 8A is a simplified block diagram of an exemplary computing system configured to perform steps of the methods illustrated herein and implement the systems shown herein, in accordance with one or more embodiments.

FIG. 8A is a simplified block diagram of an exemplary computing system configured to perform steps of the methods illustrated herein and implement the systems shown herein, in accordance with one or more embodiments. In one embodiment, computing system 800 may include computing device 801 and storage system 820. Storage system 820 may comprise a plurality of repositories and/or other forms of data storage, and it also may be in communication with computing device 801. In another embodiment, storage system 820, which may comprise a plurality of repositories, may be housed in one or more of computing device 801. In some examples, storage system 820 may store sensor data (e.g., camera data, IMU data), telemetry data, other image data, map data, networks, instructions, programs, and other various types of information as described herein (e.g., in a tracking grid or other associative data structure). This information may be retrieved or otherwise accessed by one or more computing devices, such as computing device 801, in order to perform some or all of the features described herein. Storage system 820 may comprise any type of computer storage, such as a hard drive, memory card, ROM, RAM, DVD, CD-ROM, write-capable, and read-only memories. In addition, storage system 820 may include a distributed storage system where data is stored on a plurality of different storage devices, which may be physically located at the same or different geographic locations (e.g., in a distributed computing system such as system 850 in FIG. 8B). Storage system 820 may be networked to computing device 801 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 801, which in some examples may be included in one or more components of a wearable personal location tracking system (e.g., a personal computing system in wearable visual modules 400 and 410 in FIGS. 4A-4B), also may include a memory 802. Memory 802 may comprise a storage system configured to store a database 814 and an application 816. Application 816 may include instructions which, when executed by a processor 804, cause computing device 801 to perform various steps and/or functions (e.g., inside out personal location tracking, cone of visibility generation, backtracking route generation, etc.), as described herein. Application 816 further includes instructions for generating a user interface 818. Database 814 may store various algorithms and/or data, including neural networks, sensor data, telemetry data, and other mapping and tracking data. Memory 802 may include any non-transitory computer-readable storage medium for storing data and/or software that is executable by processor 804, and/or any other medium which may be used to store information that may be accessed by processor 804 to control the operation of computing device 801.

Computing device 801 may further include a display 806, a network interface 808, an input device 810, and/or an output module 812. Display 806 (e.g., displays 502 in FIGS. 5 and 602*a*-602*d* in FIGS. 6A-6D) may be any display device by means of which computing device 801 may output and/or display data. Network interface 808 may be configured to connect to a network using any of the wired and wireless short range communication protocols described above, as well as a cellular data network, a satellite network, free space optical network and/or the Internet. Input device 810 may comprise buttons, a mouse, keyboard, touch screen, voice interface, microphone and/or any or other hand-held controller or device or interface by means of which a user may interact with computing device 801. Output module 812 may be a bus, port, and/or other interfaces by means of which computing device 801 may connect to and/or output data to other devices and/or peripherals.

In one embodiment, computing device 801 is a data center or other control facility (e.g., configured to run a distributed computing system as described herein), and may communicate with a wireless beacon locator, navigation and communications system, command and control device, and other systems and devices described herein. As described herein, system 800, and particularly computing device 801, may be used for tracking (e.g., storing, retrieving, pruning) waypoints, applying models, determining routes, generating visualization data, and otherwise implementing a personal location tracking system with a backtracking feature, as described herein. Various configurations of system 800 are envisioned, and various steps and/or functions of the processes described below may be shared among the various devices of system 800 or may be assigned to specific devices.

Figure 8B:
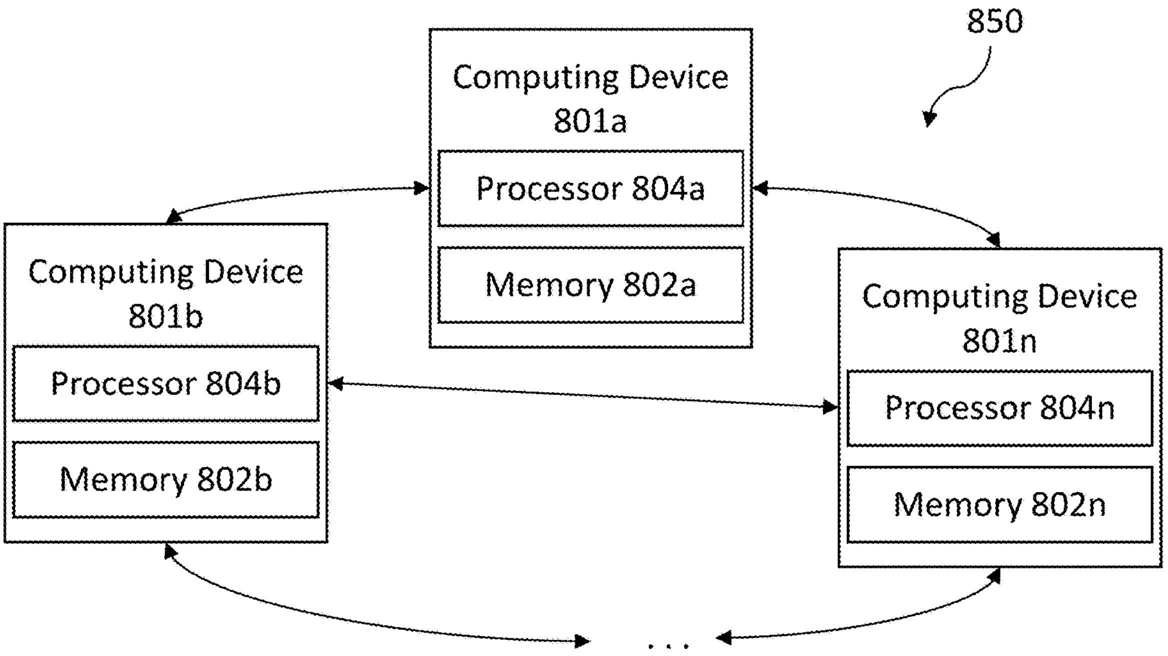
FIG. 8B is a simplified block diagram of an exemplary distributed computing system implemented by a plurality of the computing devices in FIG. 19A, in accordance with one or more embodiments.

FIG. 8B is a simplified block diagram of an exemplary distributed computing system implemented by a plurality of the computing devices in FIG. 8A, in accordance with one or more embodiments. System 850 may comprise two or more computing devices 801*a-n*. In some examples, each of 801*a-n* may comprise one or more of processors 804*a-n*, respectively, and one or more of memory 802*a-n*, respectively. Processors 804*a-n* may function similarly to processor 804 in FIG. 8A, as described above. Memory 802*a-n* may function similarly to memory 802 in FIG. 8A, as described above.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a graphical processing unit (GPU), a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A wearable personal inside-out location tracking system comprising:

an augmented reality optic system comprising a hands-free wearable display positioned to be within a field of view of a user;

a plurality of sensors comprising at least a camera and an inertial sensor;

an input component comprising one or both of a button and a microphone; and a personal computing system configured to implement an inside-out personal location tracking feature to generate a backtracking route based on a cone of visibility determined by application of a parametric model to a personal navigation history generated by the inside-out personal location tracking feature, wherein the hands-free wearable display is configured to present a visualization associated with the backtracking route.

2. The system of claim 1, wherein the personal computing system is further configured to initialize the user's personal navigation history.

3. The system of claim 1, wherein the personal navigation history comprises a first-in-first-out (FIFO) queue.

4. The system of claim 3, wherein the personal computing system is further configured to insert into the FIFO queue a pair comprising 3D coordinates and an axis-angle vector for each waypoint generated by the tracking system, thereby building a sequence of waypoints into the FIFO queue.

5. The system of claim 1, wherein the user's personal navigation history comprises a sequence of waypoints, wherein each waypoint is at least a minimum allowable time apart and a minimum distance apart.

6. The system of claim 1, wherein the parametric model comprises a set of egocentric visibility constraints, the set of egocentric visibility constraints comprising an angular threshold, a minimum distance parameter, and a maximum distance parameter, the minimum distance parameter comprising a threshold minimum distance from a current camera center and the maximum distance parameter comprising a threshold maximum distance from the current camera center.

7. The system of claim 1, wherein the parametric model further comprises a set of environment constraints.

8. The system of claim 1, wherein the personal computing system is further configured to prune the personal navigation history to generate the cone of visibility.

9. The system of claim 1, wherein the backtracking route is configured to guide the user to a waypoint within the cone of visibility.

10. The system of claim 1, wherein the personal computing system is further configured to track the user's proximity to an initial waypoint.

11. The system of claim 1, wherein the personal computing system is further configured to track the user's orientation relative to an initial reference orientation.

12. A method for personal inside-out location tracking, the method comprising:

initializing a personal navigation history comprising a first-in-first-out (FIFO) queue;

inserting into the FIFO queue a plurality of waypoints in an order in which the plurality of waypoints are generated by a personal tracking system, thereby building a sequence of waypoints into the FIFO queue, the sequence of waypoints representing a user's personal navigation history, wherein each waypoint in the FIFO queue is at least a minimum allowable time apart and a minimum distance apart;

generating a cone of visibility by pruning the user's personal navigation history according to a parametric model representing both an egocentric visibility constraint and an environment constraint; and determining a backtracking route based on the cone of visibility; and displaying the back tracking route on an augmented reality optic system comprising a hands-free wearable display positioned to be within a field of view of a user.

13. The method of claim 12, wherein the environment constraint comprises a map point.

14. The method of claim 13, wherein the map point represents an occlusion.

15. The method of claim 12, wherein the egocentric visibility constraint comprises an angular threshold, a minimum distance parameter, and a maximum distance parameter, the minimum distance parameter comprising a threshold minimum distance from a current camera center and the maximum distance parameter comprising a threshold maximum distance from the current camera center.

16. The method of claim 12, wherein each waypoint comprises a set of 3D coordinates and an axis-angle vector.

17. The method of claim 12, wherein pruning the user's personal navigation history comprises inspecting the sequence of waypoints in reverse chronological order.

18. The method of claim 12, further comprising tracking the user's proximity to an initial waypoint.

19. The method of claim 12, wherein the visualization comprises a compass.

20. The method of claim 12, wherein the visualization comprises an icon.

21. The method of claim 12, wherein the visualization comprises a banner.

* * * * *